United States Patent [19]

Fillmann

[11] 3,972,664

[45] Aug. 3, 1976

[54] INJECTION MOLDING APPARATUS FOR MANUFACTURING LAYERED ARTICLES

[75] Inventor: Werner Fillmann, Hilchenbach-Allenbach, Germany

[73] Assignee: Schloemann-Siemag Aktiengesellschaft, Dusselforf, Germany

[22] Filed: Aug. 19, 1974

[21] Appl. No.: 498,324

[30] Foreign Application Priority Data
Aug. 24, 1973 Germany............................ 2342794

[52] U.S. Cl.................................. 425/130; 425/132; 425/133.1; 425/817 R
[51] Int. Cl.² ...................... B29F 1/03; B29D 27/04
[58] Field of Search................. 264/45.1, 45.2, 45.3, 264/45.4, 328, 329, DIG. 83; 425/817 R, 132, DIG. 224, 245 R, 132, 130, 133.1

[56] References Cited
UNITED STATES PATENTS
3,070,126 12/1962 Schneider................. 425/DIG. 224
3,488,810 1/1970 Gellert............................ 425/245 R
3,778,209 12/1973 Wallace et al..................... 425/132

FOREIGN PATENTS OR APPLICATIONS
1,290,262 3/1962 France............................... 425/130

Primary Examiner—Francis S. Husar
Assistant Examiner—David S. Safran
Attorney, Agent, or Firm—Norman S. Blodgett; Gerry A. Blodgett

[57] ABSTRACT

Method and apparatus for the intermittent manufacture of multi-layer shaped thermoplastic parts with a foamed core and an unfoamed shell, where at first a part of the unfoamed plastic and later a plastic that contains a foaming agent is injected simultaneously with additional unfoamed plastic into a mold through a central nozzle and a ring nozzle that surrounds it.

1 Claim, 5 Drawing Figures

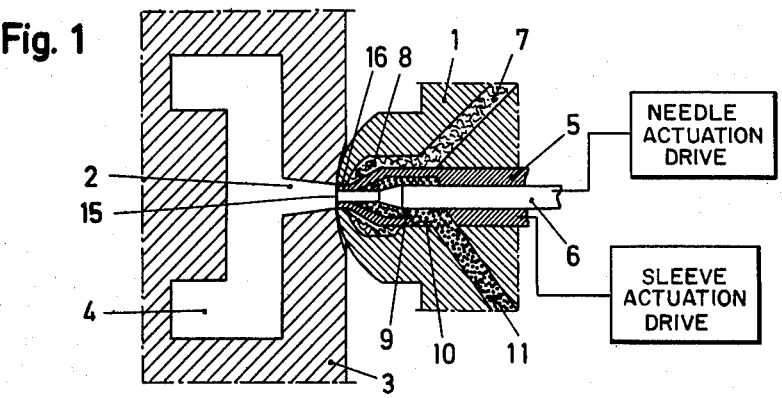
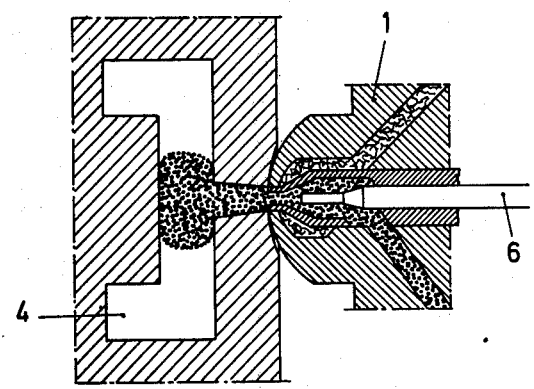
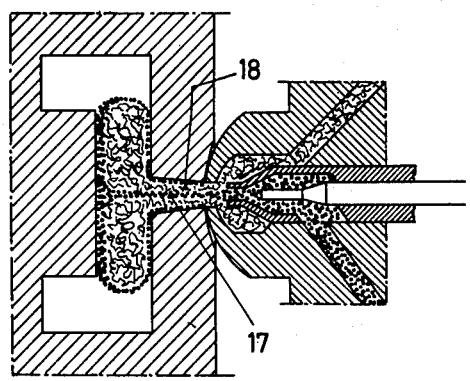
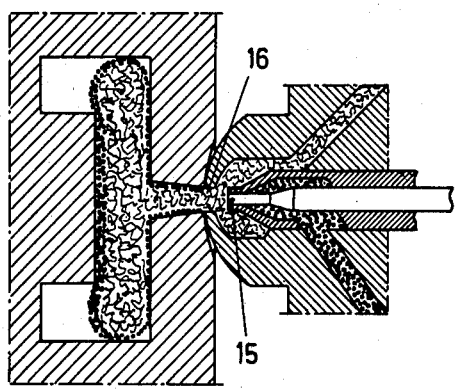
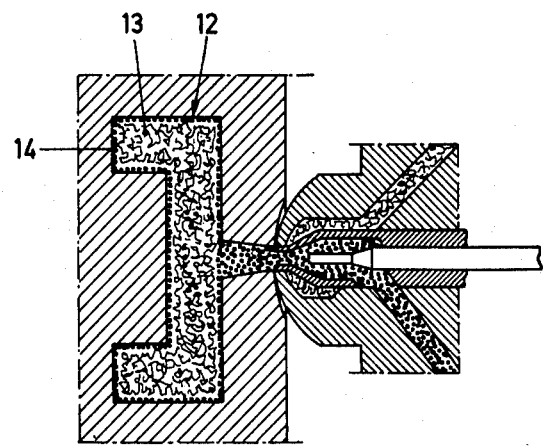

INJECTION MOLDING APPARATUS FOR MANUFACTURING LAYERED ARTICLES

BACKGROUND OF THE INVENTION

German Pat. No. 1,778,457 teaches a method for the manufacture of multi-layer shaped parts with a foamed core and an unfoamed thermoplastic shell. A mold is first injected with a plug of a first charge of unfoamable thermoplastic material which does not fill the mold. Then, prior to the solidification of the mid-section of this first charge plug, there is injected into this mid-section a second charge of thermoplastic material which contains a foaming agent. The material of the second charge presses the material of the first charge in every direction against the mold, so that this becomes fully filled. In this known method the second charge can be introduced only if the feeding of the first charge is interrupted or completely ended. This frequently results in undesirable markings at the surface of the finished shaped parts. Furthermore, particularly on shaped parts of a complex form, the first injected charge is sometimes not uniformly pressed against the walls of the mold by the subsequent charge that contains the foaming agent, but is so widely dispersed that it ruptures. This causes an interruption on the smooth surface of the shell.

German Pat. No. 2,241,002 teaches a further method for the injection molding of plastic parts with smooth surfaces and porous cores, wherein, subsequent to the injecting of the part of the plastic that forms the smooth surface, there is injected a plastic that contains a foaming agent simultaneously with additional plastic that forms the smooth surface. The plastic that contains the foaming agent flows into the mold through a central nozzle, while the plastic that forms the smooth surface arrives in the mold through a ring nozzle which surrounds the central nozzle. In this method there arrives (during the simultaneous injection phase of the two different plastics) only a small amount of the plastic that forms the smooth surface at the mold wall lying opposite to the sprue of the mold. This means that on this side of the finished shaped part (the so-called "visual" side) the shell of the plastic that forms the smooth surface is thin and sometimes is even torn. On the side of the finished shaped part adjacent to the sprue, the shell is, however, unnecessarily thick. In this method it is not possible to influence the thickness of the smooth-surfaced shell, e.g. through increase of the amount of plastic which forms the smooth surface, at the side that lies opposite to the sprue, in an economically justifiable manner. These and other difficulties experienced with the prior art devices have been obviated in a novel manner by the present invention.

It is, therefore, an outstanding object of the invention to provide a method and apparatus for the intermittent manufacture of multi-layer shaped parts of thermoplastics with a foamed core and an unfoamed shell, wherein it is assured that without an increase of the amount of plastic which forms the unfoamed shell, at least the surface opposite to the sprue (that is, the visual surface of the finished shaped part) displays a sufficiently thick shell and, above all, a compact shell with a smooth surface.

With these and other objects in view, as will be apparent to those skilled in the art, the invention resides in the combination of parts set forth in the specification and covered by the claims appended hereto.

SUMMARY OF THE INVENTION

In general, the method of the present invention proposes that the unfoamed plastic be injected into the mold through the central nozzle, while the plastic that contains a foaming agent be injected through the ring nozzle. By this method the unfoamed plastic flows during the simultaneous injection phase through the center of the sprue runner and thus arrives at the surface of the mold which lies opposite the sprue runner. This ensures, for one thing, that the unfoamed shell on the visual surface of the finished shaped part is uninterrupted. On the other hand, this method makes is possible in a simple manner to influence the thickness of the unfoamed shell in the region of the visual surface of the shaped part.

The two plastics are injected into the mold either with equal or with unequal velocity and this may be accomplished by a corresponding energization of the pistons of the injection cylinders. The apparatus for performing this method is provided with an injection head connected to two injection cylinders and with a central nozzle and a ring nozzle surrounding it. The nozzles are equipped in each case with a separately operable valve which can be controlled in accordance with the amount of plastic to be injected. Particularly, this prevents the formation of markings at the surface of the shaped part.

BRIEF DESCRIPTION OF THE DRAWINGS

The character of the invention, however, may be best understood by reference to one of its structural forms, as illustrated by the accompanying drawings in which:

FIGS. 1–5 are schematic drawings of the injection of thermoplastic material into a mold in order to form a shaped part with foamed core and unfoamed shell.

DESCRIPTION OF THE PREFERRED EMBODIMENT

The drawings illustrate in a simplified manner an injection head 1 of apparatus for the intermittent manufacture of multi-layer shaped bodies of thermoplastic material with a foamed core and an unfoamed shell. The apparatus includes an injection head mounting to which is connected two conventional injection cylinders, not shown.

The injection head 1 lies against the area around a sprue runner 2 formed in a mold 3, which in this embodiment has a simply-shaped cavity 4 for the manufacture of a multi-layer shaped part. In the injection head 1 there is supported an axially movable sleeve 5 which in turn supports an axially movable nozzle needle 6. The sleeve 5, as well as the nozzle needle 6, extend to the front face of the injection head 1 and jointly seal the discharge port of the injection head 1 (FIG. 1). To the sleeve 5 and the nozzle needle 6 there are connected separate conventional drives, schematically illustrated in FIG. 1, by means of which sleeve 5 and the nozzle needle 6 may be moved from this sealing position and back again.

A channel 7 formed in the injection head, the channel connecting one of the injection cylinders with an annulus 8 surrounding the sleeve 5. As shown in FIG. 1, this annulus 8 is closed by the sleeve 5. Between the sleeve 5 and the nozzle needle 6 is formed another annulus 9 which is connected by an outlet 10 in the sleeve 5 to a channel 11 in the injection head 1, to which channel the other injection cylinder is connected. Unfoamed thermoplastic material is fed through the channel 11 to the annulus 9 and, thus, to the injection head 1, while a plastic which contains a foaming agent arrives through the channel 7 and the annulus 8 in the injection head 1.

In the manufacture of a multi-layer shaped part 12 with a foamed core 13 and an unfoamed shell 14 (see FIG. 5) there is admitted in measured quantities (with closed sleeve and closed needle 6 as shown in FIG. 1 of the drawing) into the injection cylinder connected with channel 11 an unfoamed plastic which forms the smooth surface, and into the injection cylinder connected with channel 7 a plastic which contains a foaming agent. As soon as the two injection cylinders are loaded in the customary manner, the drive connected to the closing needle 6 is energized in such a manner that the closing needle moves from its closed position (as shown in FIG. 1) to the open position in FIG. 2. The central nozzle 15 in the sleeve 5 is then opened, so that unfoamed plastic may flow through the channel 11 and the annulus 9 into the sprue runner 2 of mold 3, and thereby into the cavity 4 (FIG. 2). As soon as a given amount of unfoamed plastic has accumulated in the mold cavity 4, the drive of sleeve 5 is energized in such a manner that the sleeve 5 moves from the sealing position of FIG. 1 to the open position of FIG. 2. A so-called ring nozzle 16 is then opened between the unfoamed plastic flowing from the injection head 1 and the outside wall of the outlet port of injection head 1 and through this nozzle now flows (simultaneously with the unfoamed plastic strand 17) another strand 18 which surrounds it. The strand 18 is of annular cross-section and formed of a plastic that contains a foaming agent which flows through the sprue runner 2 into the cavity 4 of the mold 3. The velocities of flow of these two plastic strands may either be identical or different and can be controlled by a corresponding energization of the pistons in the injection cylinders. As the initially-injected unfoamed plastic cools at the walls of the sprue runner 2 and in cavity 4 (and becomes thus more viscous) there is retained (despite the plastic that contains a foaming agent which is now flowing) at the wall of sprue runner 2 and at the adjoining wall of the cavity 4 a sheath of unfoamed plastic, as illustrated in FIG. 3.

As soon as a sufficient amount of unfoamed plastic has accumulated at the wall of the cavity 4 lying opposite the sprue runner 2, by means of a corresponding energization of the drive of the closing needle 6, this needle is then axially shifted in direction toward the mold 3 and thereby the central nozzle 15 in the sleeve 5 is shut off. Now only plastic which contains a foaming agent flows through the sprue runner 2 into the cavity 4, and this plastic expands here due to pressure release and the effect of the foaming agent so that it fills the cavity of mold completely. At the inner wall of the mold 3 a shell of unfoamed plastic is retained. As soon as a sufficient amount of the plastic which contains a foaming agent has flown into the cavity 4 to ensure a filling of the cavity, the sleeve 5 is again moved into the sealing position of FIG. 1. Normally, the manufacture of the multi-layer shaped part 12 has now been completed, so that the nozzle needle 6 is also moved together with sleeve 5 to the position shown in FIG. 1.

In case there might also exist at the severance site of the sprue a surface of unfoamed plastic, the nozzle needle 6 remains (during the closing movement of sleeve 5) in the position shown in FIG. 4, so that unfoamed plastic can now flow again through the central nozzle 15 into the sprue runner 2 (FIG. 5). By means of this unfoamed plastic, the plastic that has been left in the sprue runner 2 and which contains a foaming agent is pressed into the cavity 4 of mold 3, so that the sprue runner 2 now only contains unfoamed plastic (FIG. 5). As soon as the sprue runner 2 is completely filled with unfoamed plastic, the nozzle needle 6 returns again into the sealing position shown in FIG. 1.

With the method and apparatus of the invention, wherein the unfoamed plastic is injected into the mold 1 through a central nozzle and the plastic that contains a foaming agent is injected through a ring nozzle, it is possible, when necessary, to manufacture shaped parts which have a foamed shell and an unfoamed core of thermoplastic material. Furthermore, this method may also be used if two or more shaped parts are to be manufactured using a common sprue, and if a large-sized shaped part has to be made using two sprues.

It is obvious that minor changes may be made in the form and construction of the invention without departing from the material spirit thereof. It is not, however, desired to confine the invention to the exact form herein shown and described, but it is desired to include all such as properly come within the scope claimed.

I claim:

1. Apparatus for the fabrication of a plastic article in a closed mold, the article having a foamed core and an unfoamed outer shell, comprising:
    a. an injection head having a shaped outer surface adapted to lie firmly against the injection entrance of the mold, the head having a flow passage leading to an exit passage having the general shape of a surface of revolution, the head also having a bore coaxial of but non-coextensive with the exit passage,
    b. a sleeve slidably carried in the said bore and having a nose shaped to fit snugly in the said exit passage on occasion, the sleeve having a central longitudinally-extending flow passage leading to a central nozzle in the said nose, the sleeve also having a cylindrical bore coaxial of but non-coextensive with the central nozzle,
    c. a needle slidably carried in the said bore in the sleeve and having a nose shaped to fit snugly in the said central nozzle in the nose of the sleeve, and in operative relationship to said injection head,
    d. means for presenting plastic with no blowing agent through the flow passage of the sleeve and plastic with blowing agent through the flow passage in the head, means to actuate the apparatus to a first condition in which the needle lies axially away from the central nozzle and the sleeve lies with its nose in contact with the exit passage of the head, so that only plastic with no blowing agent flows into the mold; means for then activating the apparatus to a second condition in which the sleeve lies axially away from the exit passage of the head while the needle remains away from the central nozzle, so that both plastic with blowing agent and without blowing agent flows into the mold; means for subsequently activating the apparatus to a third condition in which the needle lies in the central nozzle while the nose remains out of contact with the exit passage, so that only plastic with blowing agent flows into the mold; and means to then activate the apparatus to a fourth condition in which the needle lies out of the central nozzle and the nose of the sleeve lies in contact with the exit passage, so that only plastic without blowing agent flows into the mold to provide the molded part with an unfoamed skin in the area of its surface adjacent the injection entrance of the mold.

* * * * *